(12) United States Patent
De Greef et al.

(10) Patent No.: US 8,537,076 B2
(45) Date of Patent: Sep. 17, 2013

(54) VIDEO CIRCUIT

(75) Inventors: Petrus Maria De Greef, Eindhoven (NL); Rob Anne Beuker, Eindhoven (NL)

(73) Assignee: Entropic Communications, Inc., San Diego, CA (US)

( * ) Notice: Subject to any disclaimer, the term of this patent is extended or adjusted under 35 U.S.C. 154(b) by 628 days.

(21) Appl. No.: 10/524,968

(22) PCT Filed: Jul. 24, 2003

(86) PCT No.: PCT/IB03/03324
§ 371 (c)(1),
(2), (4) Date: Feb. 17, 2005

(87) PCT Pub. No.: WO2004/017287
PCT Pub. Date: Feb. 26, 2004

(65) Prior Publication Data
US 2005/0253784 A1    Nov. 17, 2005

(30) Foreign Application Priority Data
Aug. 19, 2002 (EP) .................................. 02078419

(51) Int. Cl.
*G09G 3/28* (2013.01)
(52) U.S. Cl.
USPC .......................................................... 345/63
(58) Field of Classification Search
USPC ............. 345/60, 41, 37, 62, 204, 98, 54, 530, 345/547
See application file for complete search history.

(56) References Cited

U.S. PATENT DOCUMENTS

| 5,282,036 | A | | 1/1994 | Worley, Jr. |
| 5,323,247 | A | | 6/1994 | Parker et al. |
| 5,341,228 | A | | 8/1994 | Parker et al. |
| 5,477,305 | A | | 12/1995 | Parker et al. |
| 5,481,293 | A | | 1/1996 | Kanno |
| 5,543,941 | A | | 8/1996 | Parker et al. |
| 5,708,518 | A | | 1/1998 | Parker et al. |
| 5,726,772 | A | | 3/1998 | Parker et al. |
| 5,757,516 | A | | 5/1998 | Naylor, Jr. |
| 5,854,799 | A | * | 12/1998 | Okada et al. .................. 714/781 |
| 6,052,112 | A | * | 4/2000 | Tanaka et al. ................. 345/596 |
| 6,097,368 | A | | 8/2000 | Zhu et al. |
| 6,100,863 | A | | 8/2000 | Zhu |
| 6,137,542 | A | | 10/2000 | Van Mourik |

(Continued)

FOREIGN PATENT DOCUMENTS

| CN | 1239374 A | 12/1999 |
| CN | 1291403 A | 4/2001 |

(Continued)

OTHER PUBLICATIONS

CN1291403 corresponds to U.S. Patent No. 6,137,542 of record.

(Continued)

*Primary Examiner* — Dennis Joseph
(74) *Attorney, Agent, or Firm* — Bruce Greenhaus; Richard Bachand; Duane Morris LLP

(57) ABSTRACT

The invention relates to a video circuit (1) for processing video signals which show images on a display panel with linear light transition, comprising a gamma correction circuit (3), a quantizer (11) and a sub-field generator circuit (8). To save computing time, a random-access memory (7) replaces the quantizer (64).

8 Claims, 8 Drawing Sheets

(56) References Cited

U.S. PATENT DOCUMENTS

| | | | | |
|---|---|---|---|---|
| 6,166,781 | A * | 12/2000 | Kwak et al. | 348/674 |
| 6,342,950 | B1 * | 1/2002 | Tabata et al. | 358/1.6 |
| 6,614,428 | B1 * | 9/2003 | Lengyel | 345/420 |
| 6,625,667 | B1 * | 9/2003 | Westerman | 710/5 |
| 6,791,516 | B2 * | 9/2004 | Kang | 345/63 |
| 2001/0005186 | A1 * | 6/2001 | Van Dalfsen et al. | 345/60 |
| 2002/0063784 | A1 | 5/2002 | Kitagawa | |
| 2003/0001872 | A1 * | 1/2003 | Ueda et al. | 345/690 |
| 2003/0133620 | A1 * | 7/2003 | Zlotnick | 382/251 |
| 2004/0081266 | A1 * | 4/2004 | Adachi et al. | 375/376 |

FOREIGN PATENT DOCUMENTS

| | | |
|---|---|---|
| CN | 1356828 A | 7/2002 |
| EP | 0525527 | 2/1993 |
| EP | 0930716 | 7/1999 |
| JP | 04114564 A | 4/1992 |
| JP | 548905 | 2/1993 |
| JP | 05048905 A | 2/1993 |
| JP | 06233131 | 8/1994 |
| JP | 764505 | 3/1995 |
| JP | 7129114 | 5/1995 |
| JP | 08289324 A | 1/1996 |
| JP | 9179523 | 7/1997 |
| JP | 10307562 A | 11/1998 |
| JP | 10333640 | 12/1998 |
| JP | 2000023181 A | 1/2000 |
| JP | 2000066630 A | 3/2000 |
| JP | 200156665 | 2/2001 |
| JP | 2001242826 A | 9/2001 |
| JP | 2002-508909 | 3/2002 |
| JP | 200272956 | 3/2002 |
| JP | 200282647 | 3/2002 |
| WO | 02059865 | 8/2002 |

OTHER PUBLICATIONS

CN1356828 corresponds to US Publication No. 2002/063784 of record.
CN1239374 corresponds to U.S. Patent No. 6,100,863.
CN1291403 corresponds to U.S. Patent No. 6,137,542.
CN1356828 corresponds to U.S. Publication No. 2002/063784.
Bourgin, D., "Color Spaces FAQ", http://www.phys.ufl.edu/~avery/course/3400/color/color_faq_bourg.html (last HTML update May 29, 1995).
Floyd, Robert W., et al., "An Adaptive Algorithm for Spatial Greyscale", Proceeding of the S.I.D., vol. 17/2, Second Quarter, pp. 75-77 (1976).

* cited by examiner

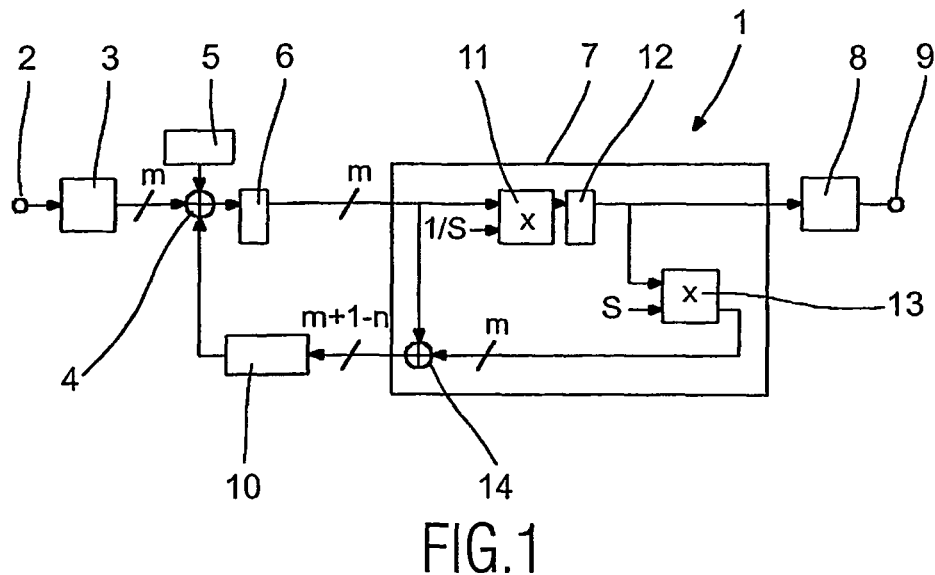
FIG.1
| x-1, y-1 | x, y-1 | x+1, y-1 |
|---|---|---|
| x-1, y | x, y | |
FIG.2
| 1/16 | 5/16 | 3/16 |
|---|---|---|
| 7/16 | x, y | |
FIG.3
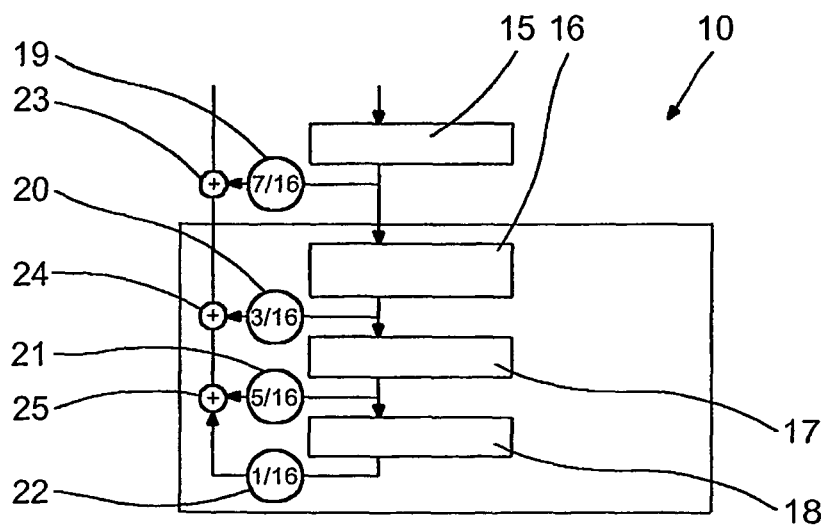
FIG.4

VIDEO CIRCUIT

PRIORITY CLAIMS/RELATED APPLICATIONS

This application is a 371 U.S. national stage filing of (and claims the benefit and priority to under 35 U.S.C. 119 and 120) PCT/IB03/03324 filed on Jul. 24, 2003, which in turn claims the benefit of and priority under 35 U.S.C. 119 to European Patent Application Serial No. 02078419.5 filed on Aug. 19, 2002, both of which are incorporated herein by reference.

The invention relates to a video circuit for processing video signals which show images on a display panel with linear light transition, comprising a gamma correction circuit, a quantizer and a sub-field generator circuit.

From U.S. Pat. No. 6,097,368 is known that video signals for showing images on a display panel of a television set comprise a red, a green and a blue signal, which is 3 times 8 bits of video data. Plasma display panel or PDP for short have a linear light transition. Therefore, the video signals subjected to a gamma function are to be corrected and the video signals converted into luminance data. Plasma display panels are limited as regards the number of luminance stages that can be displayed, a quantization process therefore reduces the number of bits. For generating red, green or blue light for a pixel, sub-fields are addressed which make a red, green or blue light source of the pixel light up for the definite period. This technique is also referred to as sub-field generation or SFG for short. Processors are provided for these methods. The conversion of video signals into luminance signals, the quantization method and the addressing of sub-fields are methods requiring time and implemented successively for a plasma display panel. If a movement occurs from one picture to the next, artefacts may occur.

Therefore it is an object of the invention to save computing time and improve the picture quality.

This object is achieved in accordance with the characteristic features of the coordinated claims 1-3.

In a first embodiment, in a first random-access memory a coarse adjustment of the quantization is effected and in a second random-access memory a fine adjustment. Time is saved with the quantization effected in a random-access memory. The splitting up into two parts provides that the necessary memory size for a 12-bit input is significantly reduced.

In a second embodiment most significant bits are quantized in a first random-access memory and least significant bits are quantized in a second random-access memory. Time is saved with the quantization effected in a random-access memory. Here too, the splitting-up into two parts significantly reduces the necessary memory size for a 12-bit input.

In a third embodiment a random-access memory replaces the quantizer. Digital data signals are applied to a random-access memory as addresses and associated values are issued from an output. This saves time compared to a computer that carries out calculations in a plurality of steps.

The random-access memory advantageously replaces a dequantizer. The formerly quantized signal is reconverted and a comparison with the input values can be made. Quantizers and dequantizers are realized in a random-access memory. A quantization error can be detected and an error scattering method can be performed by means of a filter.

The random-access memory advantageously replaces a gamma correction circuit. If a gamma correction function and a quantization are carried out in a single random-access memory, the computing time is also saved. Based on the linear light transition the video signals subjected to a gamma function are to be corrected and video data are converted into luminance data. A corresponding gamma correction function reads $x=y^n$ with n=2.4. In order to achieve a sufficiently high resolution for dark areas, at least 3 times 12 bits are to be used. Plasma display panels are limited as to the number of luminance stages that can be displayed which are typically 32 ($=2^5$) to 256 ($=2^8$) discrete stages. A quantization process reduces the number of bits and an error scattering method reduces the occurring quantization noise. The quantization process and the error scattering method are also referred to as dithering.

An inverse gamma correction circuit is advantageously included downstream of the dequantizer. If the correction in the gamma correction circuit is not converted with equidistant values, the inverse gamma correction circuit is necessary between the dequantizer and the filter. The quantizer, the dequantizer, the gamma correction circuit and the inverse gamma correction circuit are then realized in a single random-access memory.

The random-access memory advantageously replaces a sub-field generator. If the quantizer, dequantizer and sub-field generator are collectively realized in a single random-access memory, computer time is also saved.

A gamma function, a quantization, a sub-field generation circuit and a partial line doubling are advantageously achieved by means of two random-access memories. Least significant bits of sub-fields of two neighboring lines are identical and time is saved then. The sub-field generator circuit of a first random-access memory outputs a bit sample with which a plasma display panel can be driven directly and furthermore outputs data via a converter, a quantizer and a filter to the input signal of the neighboring line and via a second converter, a second dequantizer also to the input signal. With sub-fields that are spread non-equidistantly by the bit sample of the least significant bits is output directly to the quantizer of the second random-access memory.

For a better understanding of the invention, an example of embodiment will be explained hereinafter with reference to the drawing in which:

FIG. 1 shows a block circuit diagram comprising a random-access memory for a quantization process and subsequent dequantization process, FIG. 2 shows a display panel section with neighboring pixels, FIG. 3 shows the display panel section with correction values for the neighboring pixels, FIG. 4 shows a filter with delay elements, FIG. 5 shows a block circuit diagram with two random-access memories for a coarse and a fine adjustment of a quantization process, FIG. 6 shows a block circuit diagram with two random-access memories for most significant and least significant bits of a quantization process, FIG. 7 shows a block circuit diagram with a random-access memory which replaces a gamma correction function and a quantization process for equidistant values, FIG. 8 shows a block circuit diagram with a random-access memory which replaces a gamma correction function and a quantization process and their reverse functions for non-equidistant values, FIG. 9 shows a diagram for the representation of quantization noise with a classification in equidistant values, FIG. 10 shows a diagram for the representation of quantization noise for a classification in non-equidistant values, FIG. 11 shows a block circuit diagram with a random-access memory which replaces a gamma correction function, a quantizer and their reverse functions and a sub-field generator, FIG. 12 shows a block circuit diagram for a partial line doubling, FIG. 13 shows a block circuit diagram with two random-access memories for processing pixel values of a first and a second line for equidistant sub-line codings, FIG. 14 shows a block circuit diagram with two random-access memories for processing pixel values of a first and a second line for non-equidistant sub-field codings, FIG. 15 shows a timing diagram with sub-fields for the operation of a plasma display panel and FIG. 16 shows a second timing diagram with sub-fields for the operation of a plasma display panel in which a partial line doubling is used.

FIG. 1 shows a video circuit 1 having an input 2, a gamma correction circuit 3, an adder 4, a memory 5, a rounding circuit 6, a random-access memory 7, a sub-field generator circuit 8 also called sub-field generation or SFG circuit for short, an output 9 and a filter 10. The memory 7 replaces a multiplier circuit 11, a rounding circuit 12, a second multiplier circuit 13 and an adding circuit 14. The random-access memory 7 is also referred to as allocation table or look-up table, LUT for short. For defined values on m-defined lines the initial values which are present as a result of the functions combined in the memory 7 are calculated and stored in the memory 7.

FIG. 2 shows a display section with neighboring pixels x−1, y−1 and x, y−1 and x+1, y−1 and x−1, y and x, y. Then x is a substitute for the number of the column and y is a substitute for the number of the line.

FIG. 3 shows absolute values by which a quantization error QE which occurs at the respective spot is multiplied for the generation of a value to be displayed for a current value in a pixel x, y. The quantization error, QE for short, is also referred to as quantization noise.

Figure 5:
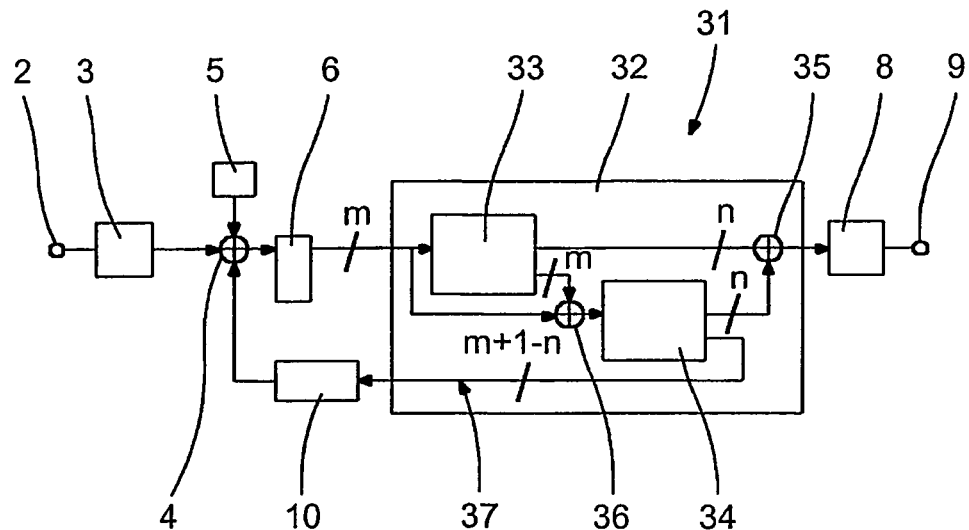

FIG. 4 shows the filter 10 comprising delay elements 15-18 and multiplier elements 19-22 and adders 23, 24, 25. The elements 15, 17 and 18 each delay by one pixel and have a memory location for the value of one pixel, the delay element 16 delays by the number of pixels of one line, subtracts two pixels and accordingly has many memory locations.

The function of the video circuit 1 can be described as follows: in the gamma correction circuit 3 a red, green or blue signal is converted into a red, green or blue luminance signal under the influence of a gamma function. A typical gamma function is non-linear and reads as follows $x=y^n$ with $n=2.4$. In order to achieve a sufficiently high resolution for dark areas, at least 3 times 12 bits are to be used. The converted red, green or blue luminance signal is applied to the adder 4 over a parallel data line comprising m or 12, respectively, lines. A value ½ from the memory 5 and a further value which is the sum of quantization noise from previous pixels are added to the luminance signal in the adder 4. With the constant value ½ it is definitely feasible for the rounding circuit 6 to perform a rounding function. The sum of the pixel values preceding the quantization noise is formed in a filter 10, as described in FIG. 4. A luminance value of a pixel value to be displayed is thus calculated as the sum of a current pixel value $X_{(x,y)}$ which is present at input 2 and of the pixel values neighboring the quantization noise values, which neighboring pixel values are calculated in the filter 10 and are added to the current value. The following equation which is satisfied after the rounding circuit 6 is the result thereof:

pixel value to be displayed=rounded $(X_{(x,y)}+\frac{1}{2}+\frac{1}{16}QE_{(x-1,y-1)}+\frac{5}{16}QE_{(x,y-1)}+\frac{3}{16}QE_{(x+1,y-1)}+\frac{7}{16}QE_{(x-1,y)})$ with the current pixel value $X_{(x,y)}$.
with the value ½ from the memory 5 and
with the values $\frac{1}{16}QE_{(x-1,y-1)}+\frac{5}{16}QE_{(x,y-1)}+\frac{3}{16}QE_{(x+1,y-1)}+\frac{7}{16}QE_{(x-1,y)}$ as a total sum from filter 10.

The quantizer is defined by the following function $$F(x)=(x/S)$$

where S is the quantization factor that is calculated as follows

S=number of input stages/number of output stages=1024/256=4

The dequantization function is predefined by $$F(y)=y*S$$

The influence on the current pixel value $X_{(x,y)}$ by the filter values is also known as the Floyd-Steinberg algorithm. The random-access memory 7 replaces the two multiplications 11 and 13, the rounding function 12 and the addition 14. This means that for m addresses memory values are available for n outputs to the SFG circuit 8 and m+1−n outputs to the filter 10, which are all in all $2^{m*(m+1)}$ memory locations.

FIG. 5 shows a second video circuit 31 having an input 2, the gamma correction circuit 3, the adder 4, the memory 5, the rounding circuit 6, the SFG circuit 8, the output 9, the filter 10 and a circuit 32. The circuit 32 has a coarse-value random-access memory 33, a fine-value random-access memory 34 and two adders 35 and 36. The coarse-value random-access memory 33 performs a coarse adjustment in the quantization for the output and the fine-value random-access memory 34 a fine adjustment in the quantization for the output and a feedback loop 37. As a result, the look-up table is split up into two sub-memories 33 and 34 and the necessary memory size is significantly reduced by 0.8 kbyte for a 12-bit input.

Figure 6:
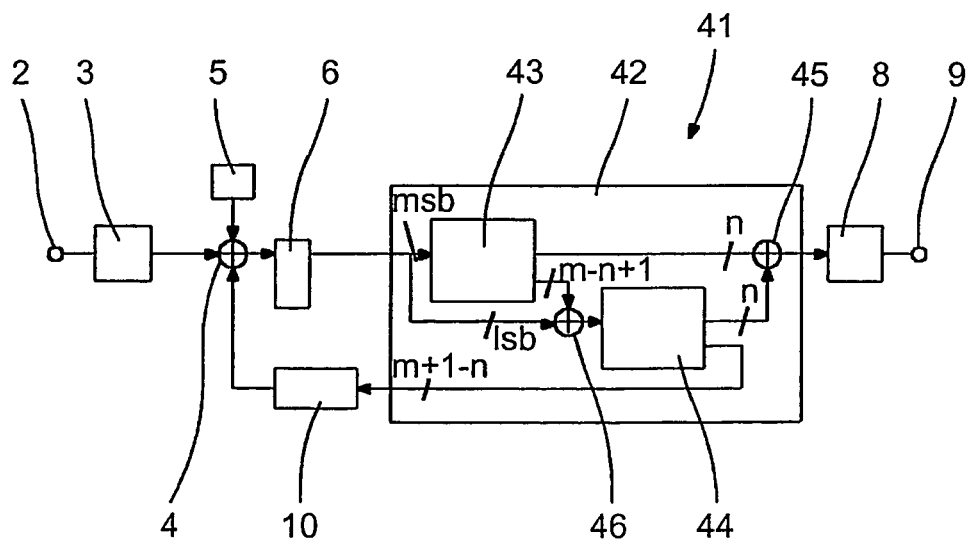

FIG. 6 shows a further video circuit 41 having the input 2, the gamma correction circuit 3, the adder 4, the memory 5, the rounding circuit 6, the SFG circuit 8, the output 9, the filter 10 and a circuit 42. The circuit 42 has an MSB random-access memory 43, an LSB random-access memory 44 and two adders 45 and 46. MSB is the abbreviation of most significant bits, thus high-order bits, LSB stands for least significant bits, low-order bits. The input data stream of the parallel data is divided into two halves, where m-k parallel data, which corresponds to m-k parallel lines, flow as MSB into the first memory 43 and $2^{m-k}$ addresses are detected there. A second half k of parallel data, which corresponds to k parallel lines, flows into the memory 44. A quantization error is further subtracted in the adder 46 from the LSB data.

The function of the circuit 42 is explained for simplicity with values from the decimal system and is as follows.

After the adder 45 the value 41 should be present on the output of circuit 41. In the MSB random-access memory 43 output values for MSB input values are issued in tens, thus in steps of ten and in the LSB random-access memory 44 output values for LSB input values are issued in steps of one. If, however, the MSB memory 43 cannot supply the value 40, but only 39, a quantization error QE occurs on the output of the MSB memory 43, which also flows into the LSB memory 44 via the adder 46. The quantization error would be −1 as absolute value, the addition of the negated value to the LSB value which is 1 is then:

LSB−(−1)=LSB+1=2.

Thus the necessary memory size is reduced by 0.25 kbyte for a 12-bit input. In this architecture the random-access memory is divided into two parts, one part generates an MSB quantization and an associated quantization error on a first output and the other part generates the LSB quantization and an associated quantization error on a second output. If the two output signals are added together, this will lead to the new quantized value. The size of the MSB random-access memory is $2^{m/2+(m+1)}$ The size of the LSB random-access memory is $2^{(m+1)/2+(m+1)}$ The contents of the Table can be easily generated with the following algorithm:

Rounded off:

$$(X_{(x,y)}+\tfrac{1}{2}+\tfrac{1}{16}QE_{(x-1,y-1)}+\tfrac{5}{16}QE_{(x,y-1)}+\tfrac{3}{16}QE_{(x+1,y-1)}+\tfrac{7}{16}QE_{(x-1,y)})$$

X is the value of the newly arriving pixel and QE is the quantization error of previously generated pixel values.

Figure 7:
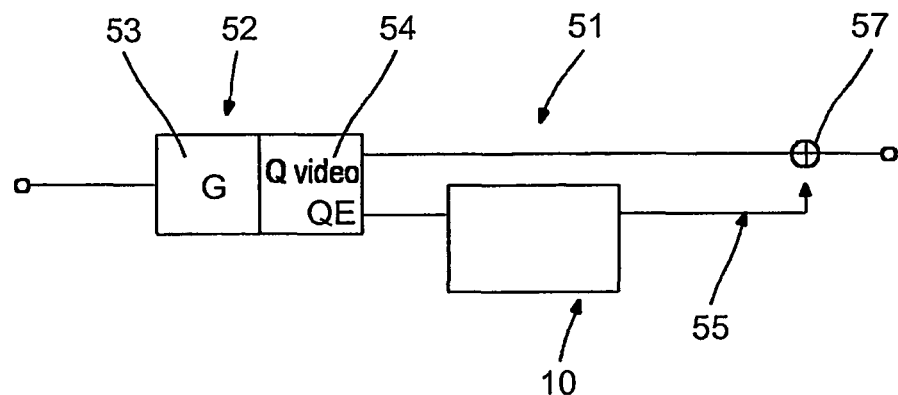

The new quantization output signal is:

Rounded $(\tfrac{1}{2}_n+1/S^*$rounded $(X_{(x,y)}+\tfrac{1}{2}_m+\tfrac{1}{16}QE_{(x-1,y-1)}+\tfrac{5}{16}QE_{(x,y-1)}+\tfrac{3}{16}QE_{(x+1,y-1)}+\tfrac{7}{16}QE_{(x-1,y)}))$ The new quantization error is:

Rest $(\tfrac{1}{2}_n+1/S^*$rounded $(X_{(x,y)}+\tfrac{1}{2}_m+\tfrac{1}{16}QE_{(x-1,y-1)}+\tfrac{5}{16}QE_{(x,y-1)}+\tfrac{3}{16}QE_{(x+1,y-1)}+\tfrac{7}{16}QE_{(x-1,y)}))$ FIG. 7 shows a video circuit 51 comprising a random-access memory 52 in which a gamma correction function 53 and a quantization function 54 are combined. The gamma correction function 53 is converted with equidistant values, so that the error spreading in the luminance area is effected by means of a forward controller 55. A current value from the luminance area is added to the filter value from the filter 10 in an adder 57.

Figure 8:
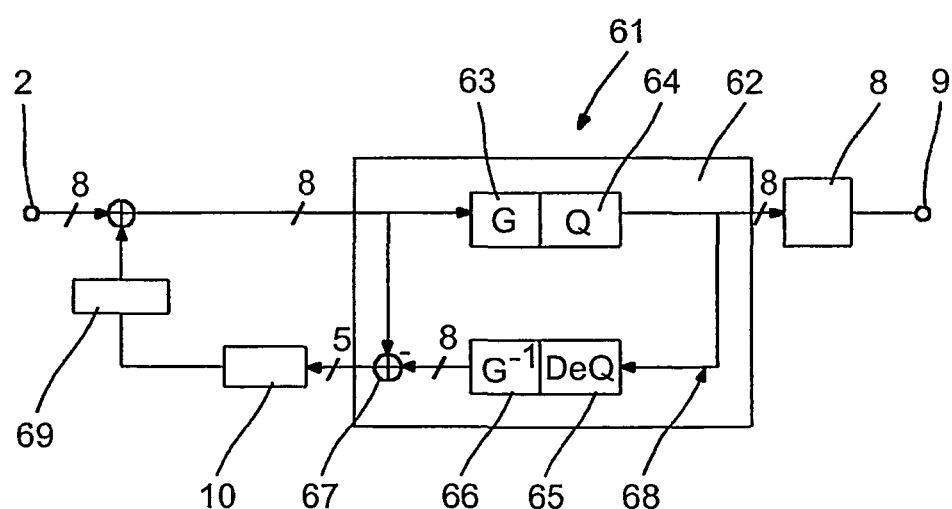

FIG. 8 shows a video circuit 61 comprising a random-access memory 62 for values converted with non-equidistant values. The memory 62 replaces a gamma correction circuit 63, a quantizer 64, a dequantizer 65, an inverse gamma correction circuit 66 and an adder 67. Since the gamma-corrected values in the gamma correction circuit 63 have been converted with non-equidistant values, an inverse gamma correction circuit 66 is included in a feedback loop 68. A rounding circuit 69 is inserted between the filter 10 and the adder 4.

Figure 9:
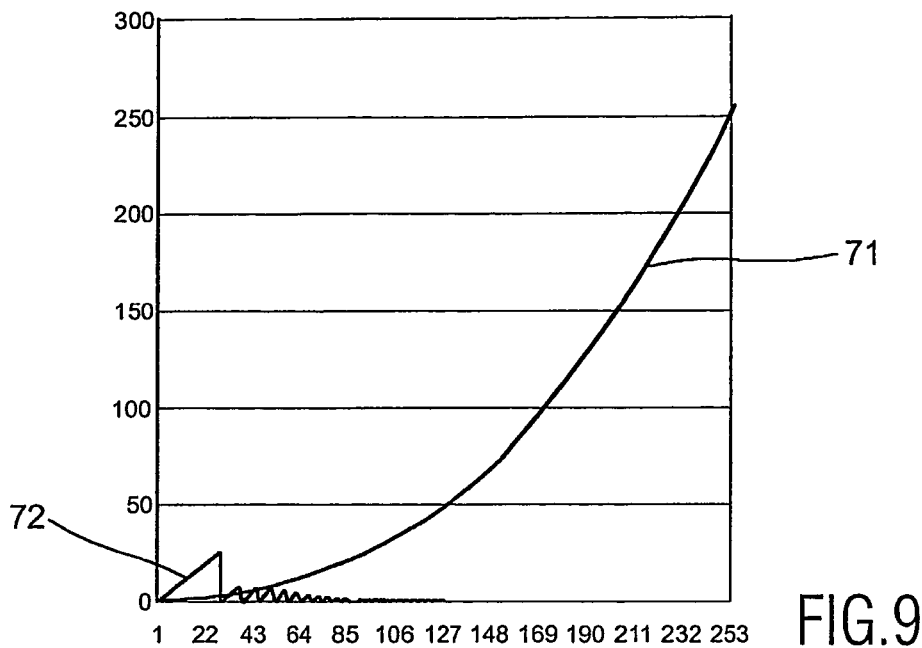

FIG. 9 shows a gamma curve 71 which is converted with equidistant values. The result is a quantization noise curve 72 with a high quantization error in a dark area between the absolute values 1 and 22. Especially in dark areas the perception by the human eye is better than in bright areas. The high quantization error is thus perceived by a viewer. This provides a discrepancy between sampling and perception.

Figure 10:
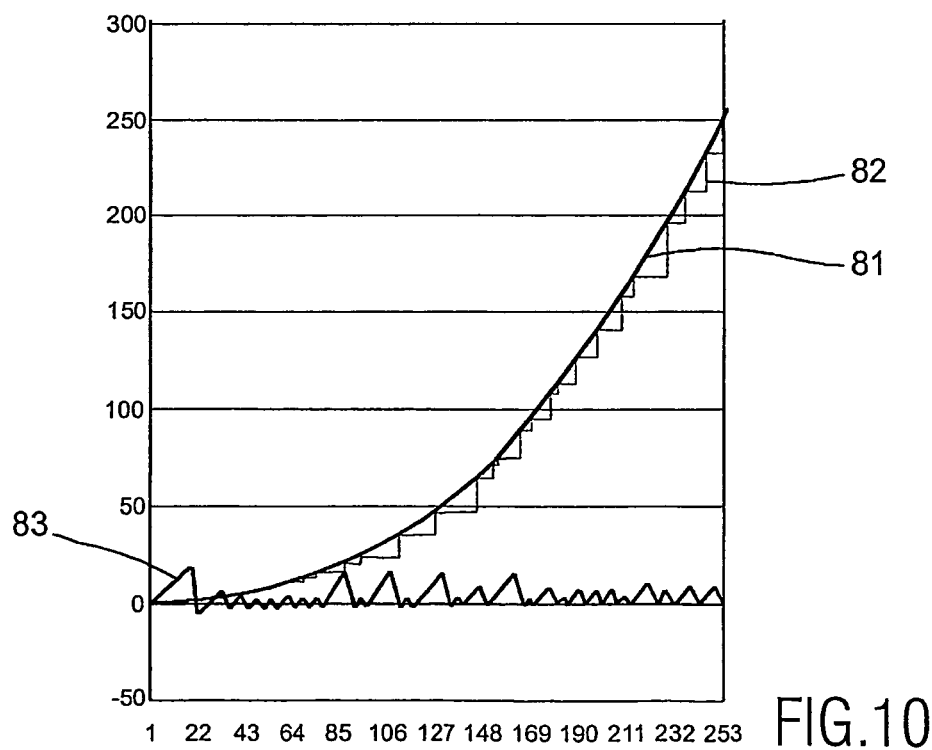

FIG. 10 shows a gamma curve 81 which is sampled with non-equidistant values. The non-equidistant values are shown as curve 82. A quantization noise curve 83 with a rather large quantization noise in a dark area between the absolute values 1 and 22 is smaller than the QE in values converted equidistantly. The first value in the dark area has a small quantization error. In bright areas the quantization noise is larger. The quantization noise in bright areas, however, can be perceived less by a viewer. The sample values thus correspond to the observation.

Figure 11:
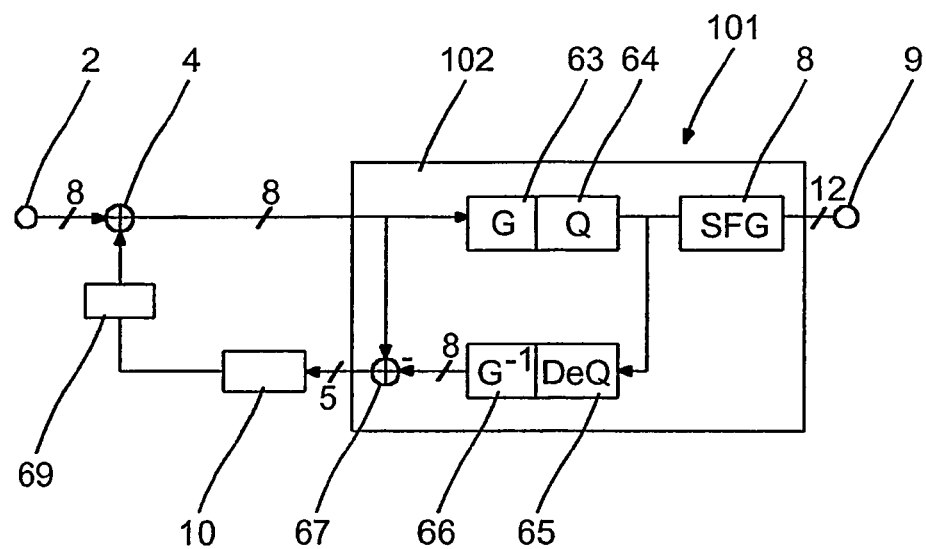

FIG. 11 shows a video circuit 101 comprising a random-access memory 102 which replaces the gamma correction circuit 63, the quantizer 64, the dequantizer 65, the inverse gamma correction circuit 66, the addition 67 and the sub-field generator 8.

Figure 12:
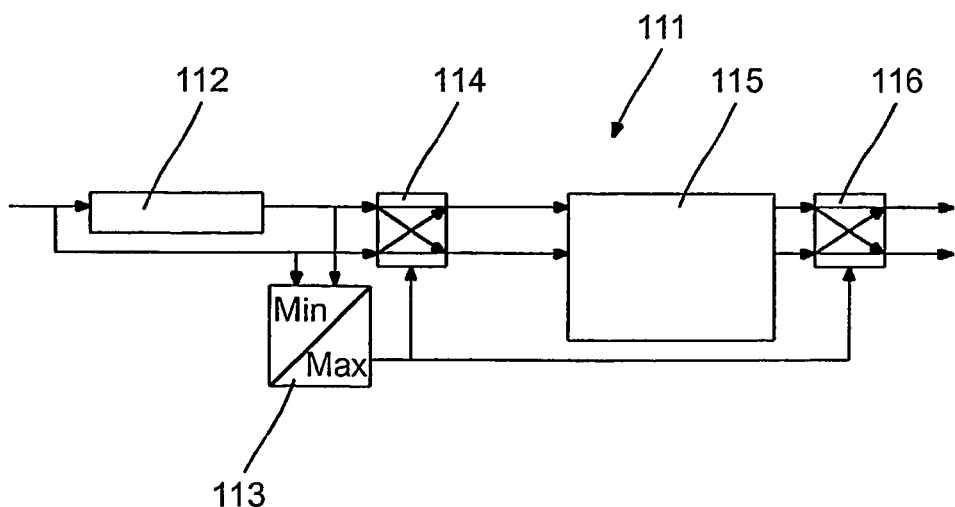

FIG. 12 shows a circuit 111 comprising a line delay 112, a min/max detection circuit 113, a first substitution circuit 114, a partial line doubling circuit 115 and a second substitution circuit 116. The line of a television picture is delayed by one line in the delay circuit 112. Then values of two pixels lying beside each other in one column are compared in the detection circuit 113. The respective larger value is defined and applied to a first or second input of the doubling circuit 115. If the lines are then substituted in the substitution circuit 114, a re-substitution is made in the second substitution circuit 116.

Figure 13:
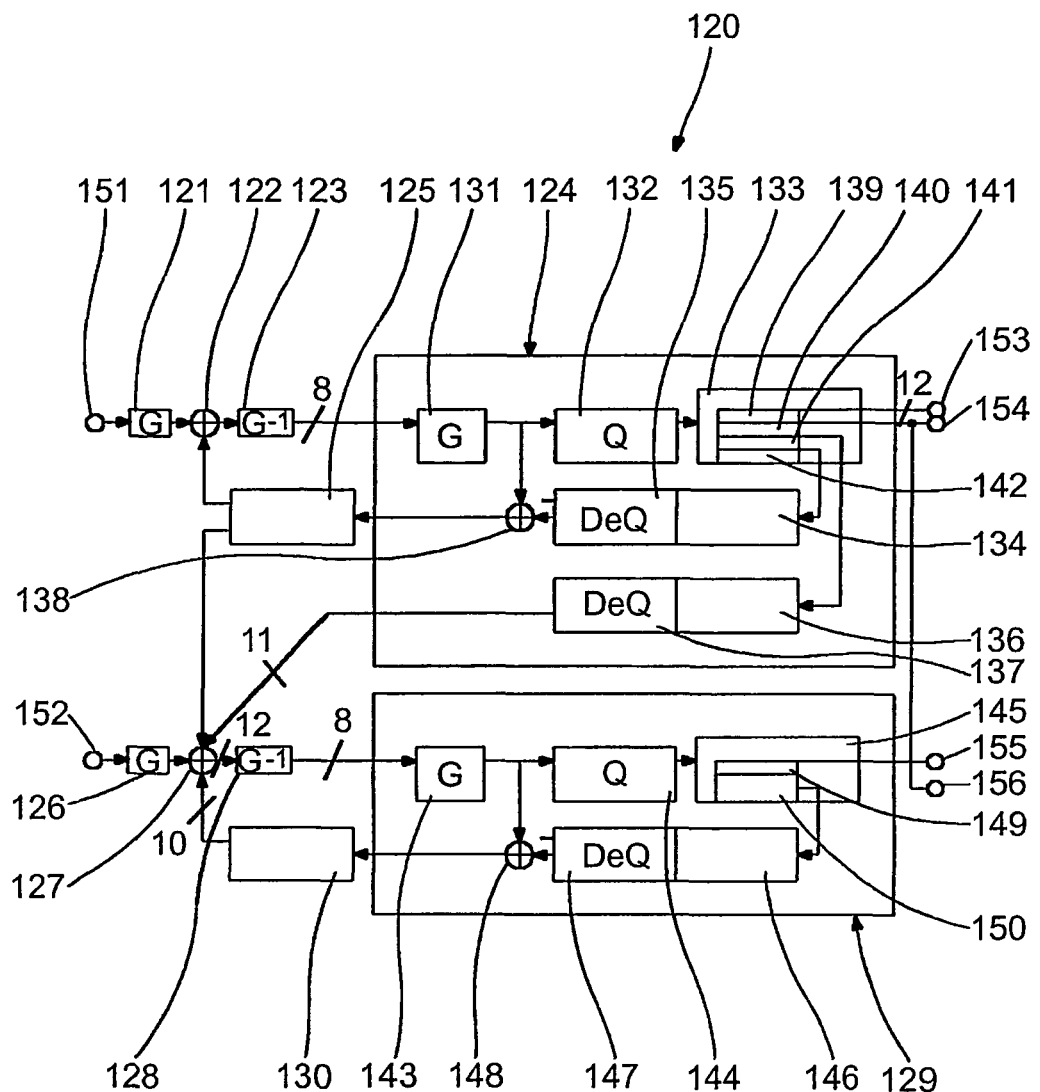

FIG. 13 shows a first partial line doubling circuit 120 for equidistant sub-field codings which circuit can be used for the partial line doubling circuit 115, comprising a first gamma correction circuit 121, an adder 122, an inverse gamma correction circuit 123, a memory 124, a 2D filter 125, a further gamma correction circuit 126, a further adder 127, an inverse gamma correction circuit 128, a further memory 129 and a one-dimensional filter 130. The memory 124 replaces a gamma correction circuit 131, a quantizer 132, an SFG and a PLD circuit 133, a converter 134, a dequantizer 135, a second converter 136, a second dequantizer 137 and an adder 138. The SFG and PLD circuit 133 includes an MSG circuit 139, an LSG circuit 140, an LSG light circuit 141 and a QE circuit 142. The memory 129 replaces a gamma correction circuit 143, a quantizer 144, an SFG and PLD circuit 145, a further converter 146, a dequantizer 147 and an adder 148. The SFG and PLD circuit 145 includes an MSG circuit 149 and a QE circuit 150. Signals are present on inputs 151 and 152 and output signals are output via the outputs 153, 154, 155 and 156. This partial line doubling circuit 120 can be used instead of the partial line doubling circuit 115.

Figure 14:
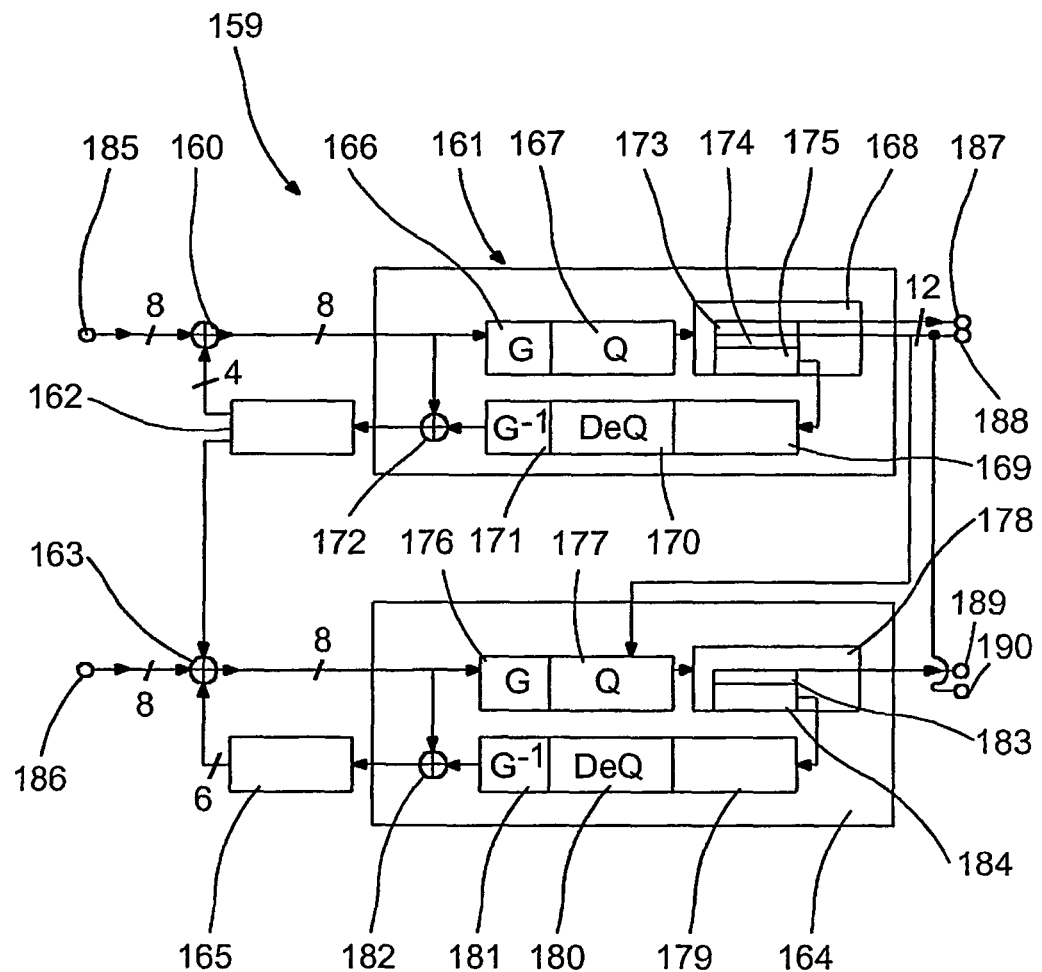

FIG. 14 shows a second partial line doubling circuit 159 for non-equidistant sub-field codings, which circuit 159 can be used instead of the partial line doubling circuit 115, with an adder 160, a memory 161, a 2D filter 162, a further adder 163, a further memory 164 and a one-dimensional filter 165. The memory 161 replaces a gamma correction circuit 166, a quantizer 167, an SFG and PLD circuit 168, a converter 169, a dequantizer 170, an inverse gamma correction circuit 171 and an adder 172. The SFG and PLD circuit 168 includes an MSG circuit 173, an LSG circuit 174 and a QE circuit 175. The memory 164 replaces a gamma correction circuit 176, a quantizer 177, an SFG and PLD circuit 178, a converter 179, a dequantizer 180, an inverse gamma correction circuit 181 and an adder 182. The SFG and PLD circuit 178 includes an MSG circuit 183 and a QE circuit 184. Signals are present on inputs 185 and 186 and output signals are output via outputs 187, 188, 189 and 190.

Figure 15:
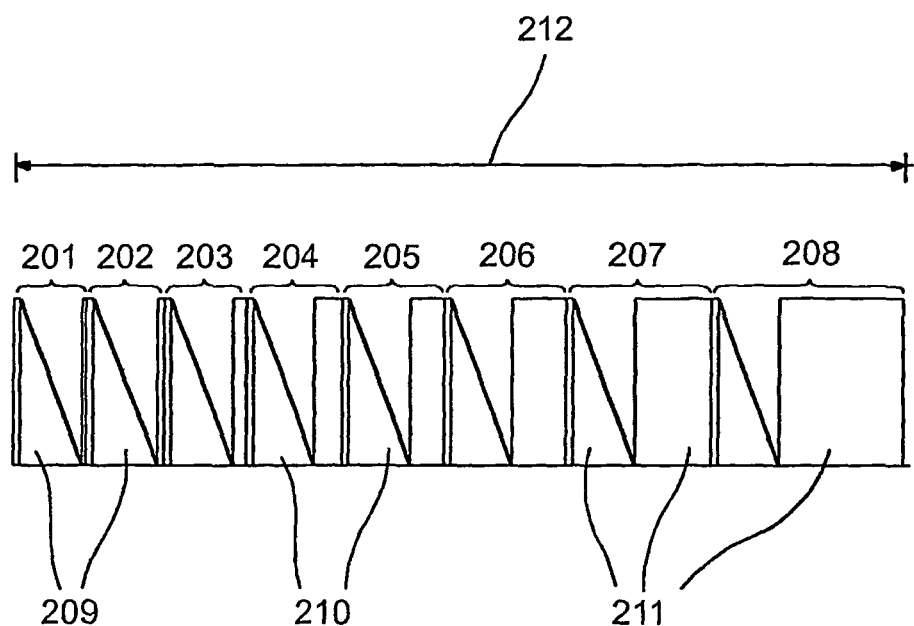

FIG. 15 shows eight sub-fields 201 to 208, SF for short. Each sub-field has an erasing time 209, an addressing time 210 and a sustaining time 211. The eight sub-fields cover a picture duration 212. The sub-fields 201 to 204 represent least significant bits of a group or LSB for short of a least significant group or LSG for short. The sub-fields 205 to 208 represent most significant bits or MSB of a most significant group or MSG.

Figure 16:

If the LSB for two successive lines are identical, there is a time-saving 213 as shown in FIG. 16. The doubling of partial ranges of a line is called partial line doubling in English, PLD for short. Only during the stop period are emitted light pulses from the red, green or blue light sources of a pixel.

The function of the circuit 120 is as follows: pixel values are present on the input of the memory 124 and are converted in the gamma correction circuit 131 into the luminance area, therefore, an 8-bit data word becomes an 12-bit data word to achieve a sufficiently high resolution in dark areas. In the subsequent quantizer the 12-bit data word is adapted to a data word that is necessary for the sub-field generation. The latter data word is applied to the SFG and PLD circuit 133 and an associated bit sample of sub-fields is generated in this circuit.

To avoid artefacts, other sub-fields are addressed in boundary areas than the sub-fields that are responsive of the pixel value to be displayed. A typical example is to address only the sub-field 208 instead of the sub-fields 201 to 207. In addition to the quantizing error an addressing error will then occur. This error is applied by the QE circuit 142 to a converter 134 which converts the light value signal into a luminance signal and eliminates any occurring addressing error. From the converter 134 the signal is conveyed to the dequantizer 135 which cancels the quantization. The value generated now is compared with the signal from the correction circuit 131 and the actual quantization error is determined in the adder 138. The quantization error is applied to the 2D filter 125 and filtered in accordance with the Floyd-Steinberg algorithm. Since the filtered quantization error is situated in the luminance area and is to be applied to the input signal, the input signal is transformed into the luminance area by the gamma correction circuit 121. This transformation is cancelled in the inverse gamma correction circuit 123.

Since the filtered quantization error also influences pixel values of pixels of the neighboring line, the filter 125 is connected via an electrically conductive line to the adder 127. Thus an output signal of the 2D filter is added for further processing to an input signal which represents pixel values of the neighboring line.

If an addressing error occurs, a respective correction signal is transported from the LSG circuit 141 via the converter 136, the dequantizer 137 to the adder 127 and thus the input signal is corrected which represents pixel values of pixels of the neighboring line.

The video signals in the gamma correction circuit 143 in the memory 129 are transformed from the video area into the luminance area, then quantized in the quantizer 144 and conveyed to an SFG and PLD circuit 145 which generates the bit sample for the sub-fields of the PDP. Only the MSG are generated then. A light value signal is reconverted in the converter circuit 146 into a luminance signal and a possible addressing error is eliminated. The luminance signal is dequantized in the dequantizer 147 and applied to the adder 148. In the adder is determined an actual quantization error and applied to the filter 130. The quantization error has no effect on neighboring lines, so that only a one-dimensional filter 130 is used.

Since here too the processing takes place in the luminance area, the adder 127 is surrounded by a gamma correction circuit 126 and an inverse gamma correction circuit 128 which convert the values of the current pixel of the second neighboring line.

The function of the circuit 159 can be described as follows: pixel values are present on an input 185 of the circuit 159 and are converted into the luminance area in the gamma correction circuit 166 and for this purpose an 8-bit data word becomes a 12-bit data word to achieve a sufficiently high resolution in dark areas. In the subsequent quantizer 167 the 12-bit data word is adapted to a data word that is necessary for the sub-field generation. This data word is applied to the SFG and PLD circuit 168 and in this circuit an associated bit sample of sub-fields is generated which is output via the outputs 187 and 188.

To exclude artefacts, different sub-fields are addressed in boundary areas than the sub-fields that are responsive to the picture value to be displayed. An addressing error then occurs in addition to the quantization error. This addressing error is applied by the QE circuit 175 to a converter 169 which converts the light value signal into a luminance signal and cancels any occurring addressing error. From the converter 169 the signal is conveyed to the dequantizer 170 which cancels the quantization. The downstream inverse gamma correction circuit 171 converts luminance data into video data so that a value in the video area is present on an output of the inverse gamma correction circuit 171, which video area value corresponds to the output value on the outputs 187 and 188. This value is compared in the adder 172 to the input signal and an actual quantization error is determined. The quantization error is filtered in the filter 162 and the actual pixel values of a first line are added to the input 185.

Since the filtered quantization error also influences pixel values of pixels of the neighboring line, the filter 162 is connected to the adder 163 via an electrically conducting line. Thus an output signal of the 2D filter is added to an input signal for further processing which input signal represents pixel values of the neighboring line.

In the memory 164 the video signals in the gamma correction circuit 176 are transformed from the video area to the luminance area, then quantized in the quantizer 177 and conveyed to an SFG and PLD circuit 178 which generates the sub-fields for the PDP. Only the MSG are generated then. In the converter circuit 179 a light value signal is reconverted into a luminance signal and a possible addressing error is eliminated. The luminance signal is dequantized in the dequantizer 180 and applied to the inverse gamma correction circuit 181. In the adder 182 is detected an actual quantization error and this error is applied to the filter 165. The quantization error has no effect on neighboring lines so that only a one-dimensional filter 165 is used.

The LSB on the output 188 are directly applied to the quantizer 177 and are thus taken into account when the most significant bits of the neighboring line available on output 189 are formed.

REFERENCE LIST

| | | | |
|---|---|---|---|
| 1 | video circuit | 32 | circuit |
| 2 | input | 33 | coarse-value random-access memory |
| 3 | gamma correction circuit | 34 | fine-value random-access memory |
| 4 | adder | 35 | adder |
| 5 | memory | 36 | adder |
| 6 | rounding circuit | 37 | feedback loop |
| 7 | random-access memory | 38 | |
| 8 | sub-field generator circuit | 39 | |
| 9 | output | 40 | |
| 10 | filter | 41 | video circuit |
| 11 | multiplier circuit | 42 | circuit |
| 12 | rounding circuit | 43 | MSB random-access memory |
| 13 | second multiplier circuit | 44 | LSB random-access memory |
| 14 | adder circuit | 45 | adder |
| 15 | delay element | 46 | adder |
| 16 | delay element | 47 | |
| 17 | delay element | 48 | |
| 18 | delay element | 49 | |
| 19 | multiplier element | 50 | |
| 20 | multiplier element | 51 | video circuit |
| 21 | multiplier element | 52 | random-access memory |
| 22 | multiplier element | 53 | gamma correction circuit |
| 23 | adder | 54 | quantizer |
| 24 | adder | 55 | forward controller |
| 25 | adder | 56 | delay element |
| 26 | | 57 | adder |
| 27 | | 58 | |
| 28 | | 59 | |
| 29 | | 60 | |
| 30 | | 61 | video circuit |
| 31 | video circuit | 62 | random-access memory |
| 63 | gamma correction circuit | 94 | |
| 64 | quantizer | 95 | |
| 65 | dequantizer | 96 | |
| 66 | inverse gamma correction circuit | 97 | |
| 67 | adder | 98 | |

-continued

| | | | | |
|---|---|---|---|---|
| 68 | feedback loop | 99 | | |
| 69 | rounding circuit | 100 | | |
| 70 | | 101 | video circuit | |
| 71 | gamma curve | 102 | random-access memory | |
| 72 | quantization noise curve | 103 | sub-field generation | |
| 73 | | 104 | | |
| 74 | | 105 | | |
| 75 | | 106 | | |
| 76 | | 107 | | |
| 77 | | 108 | | |
| 78 | | 109 | | |
| 79 | | 110 | | |
| 80 | | 111 | circuit | |
| 81 | gamma curve | 112 | line delay | |
| 82 | curve | 113 | Min/Max detection circuit | |
| 83 | quantization noise curve | 114 | substitution circuit | |
| 84 | | 115 | partial line doubling circuit | |
| 85 | | 116 | second substitution circuit | |
| 86 | | 117 | | |
| 87 | | 118 | | |
| 88 | | 119 | | |
| 89 | | 120 | partial line doubling circuit | |
| 90 | | 121 | gamma correction circuit | |
| 91 | | 122 | adder | |
| 92 | | 123 | inverse gamma correction circuit | |
| 93 | | 124 | memory | |
| 125 | 2D filter | 157 | | |
| 126 | gamma correction circuit | 158 | | |
| 127 | adder | 159 | second partial line doubling circuit | |
| 128 | inverse gamma correction circuit | 160 | adder | |
| 129 | memory | 161 | memory | |
| 130 | one-dimensional filter | 162 | 2D filter | |
| 131 | gamma correction circuit | 163 | adder | |
| 132 | quantizer | 164 | memory | |
| 133 | SG ad PLD circuit | 165 | one-dimensional filter | |
| 134 | converter | 166 | gamma correction circuit | |
| 135 | dequantizer | 167 | quantizer | |
| 136 | converter | 168 | SFG and PLD circuit | |
| 137 | second dequantizer | 169 | converter | |
| 138 | adder | 170 | dequantizer | |
| 139 | MSG circuit | 171 | inverse gamma correction circuit | |
| 140 | LSG circuit | 172 | adder | |
| 141 | LSG light circuit | 173 | MSG circuit | |
| 142 | QE circuit | 174 | LSG circuit | |
| 143 | gamma correction circuit | 175 | QE circuit | |
| 144 | quantizer | 176 | gamma correction circuit | |
| 145 | SFG and PLD circuit | 177 | quantizer | |
| 146 | inverse luminance circuit | 178 | SFG and PLD circuit | |
| 147 | dequantizer | 179 | converter | |
| 148 | adder | 180 | dequantizer | |
| 149 | MSG circuit | 181 | inverse gamma correction circuit | |
| 150 | QE circuit | 182 | adder | |
| 151 | input | 183 | MSG circuit | |
| 152 | input | 184 | QE circuit | |
| 153 | output | 185 | input | |
| 154 | output | 186 | input | |
| 155 | output | 187 | output | |
| 156 | output | 188 | output | |
| 189 | output | 221 | | |
| 190 | output | 222 | | |
| 191 | | 223 | | |
| 192 | | 224 | | |
| 193 | | 225 | | |
| 194 | | 226 | | |
| 195 | | 227 | | |
| 196 | | 228 | | |
| 197 | | 229 | | |
| 198 | | 230 | | |
| 199 | | 231 | | |
| 200 | | 232 | | |
| 201 | sub-field | 233 | | |
| 202 | sub-field | 234 | | |
| 203 | sub-field | 235 | | |
| 204 | sub-field | 236 | | |
| 205 | sub-field | 237 | | |
| 206 | sub-field | 238 | | |
| 207 | sub-field | 239 | | |
| 208 | sub-field | 240 | | |
| 209 | erasing time | | | |
| 210 | addressing time | | | |
| 211 | sustaining time | | | |
| 212 | duration of image | | | |
| 213 | time saving | | | |
| 214 | | | | |
| 215 | | | | |
| 216 | | | | |
| 217 | | | | |
| 218 | | | | |
| 219 | | | | |
| 220 | | | | |

The invention claimed is:

1. A video circuit for processing video signals which show images on a display panel with linear light transition, comprising
a gamma correction means,
a quantization means, and
a sub-field generation means,
wherein said gamma correction means, said quantization means, and dequantization means are performed in a random-access memory, and the gamma correction means provides gamma-corrected values that have been converted with non-equidistant values,
a filter configured to process the multiple quantization errors of the different neighboring pixels of the current pixel to generate a processing result, wherein the filter comprises multiplier elements, adders and serially connected delay elements;
an adder configured to combine the processing result with the current pixel to generate a combined result; and
further wherein multiple quantization errors of different neighboring pixels of a current pixel are used to generate a pixel value to be displayed on the display panel, wherein the pixel value to be displayed and the multiple quantization errors of the different neighboring pixels satisfy:

$$\text{PVTBD} = \text{rounded}\,(X_{(x,y)} + CV + a \times QE(X_{(x-1,y-1)}) + b \times QE(X_{(x,y-1)}) + c \times QE(X_{(x+1,y-1)}) + d \times QE(X_{(x-1,y)})),$$

where PVTBD represents the pixel value to be displayed, rounded( ) represents a rounding function, CV represents a constant value to perform the rounding function, X(x,y) represents the current pixel that is located in column x and line y of an image, QE(X(x−1,y−1)) represents quantization error of a neighboring pixel that is located in column x−1 and line y−1 of the image, QE(X(x,y−1)) represents quantization error of a neighboring pixel that is located in column x and line y−1 of the image, QE(X(x+1,y−1)) represents quantization error of a neighboring pixel that is located in column x+1 and line y−1 of the image, QE(X(x−1,y)) represents quantization error of a neighboring pixel that is located in column x−1 and line y of the image, and a, b, c and d represent multiplier coefficients for QE(X(x−1,y−1)), QE(X(x,y−1)), QE(X(x+1,y−1)) and QE(X(x−1,y)), respectively, wherein the coefficient a has a value of $1/16$, the coefficient b has a value of $5/16$, the coefficient c has a value of $3/16$ and the coefficient d has a value of $7/16$.

2. A video circuit as claimed in claim 1, wherein an inverse gamma circuit is arranged downstream of the random-access memory.

3. A video circuit as claimed in claim 1, wherein the random-access memory is said sub-field generating means.

4. A video circuit as claimed in claim 3, wherein sub-field generation values are applied to a filter via a conversion means and a dequantization means.

5. A video circuit as claimed in claim 4, wherein the filter applies values to an adder which is situated in an input area of a second signal which represents pixel values of a neighboring line.

6. A video circuit as claimed in claim 5, wherein sub-field generation values are applied to the adder via a second conversion means and a second dequantization means.

7. A video circuit as claimed in claim 5, wherein pixel values of the neighboring line are quantized in a quantization means and sub-fields are generated in a further sub-field generation means wherein a further second random-access memory is said further quantization means and said further sub-field generation means.

8. A video circuit as claimed in claim 1, wherein the constant value is ½.

\* \* \* \* \*